(12) United States Patent
Sundaresan et al.

(10) Patent No.: US 8,134,946 B2
(45) Date of Patent: Mar. 13, 2012

(54) SYSTEM AND METHOD FOR SCHEDULING IN RELAY-ASSISTED WIRELESS NETWORKS

(75) Inventors: Karthikeyan Sundaresan, Princeton, NJ (US); Xiaodong Wang, New York, NY (US); Mohammad Madihian, Plainsboro, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 858 days.

(21) Appl. No.: 12/147,680

(22) Filed: Jun. 27, 2008

(65) Prior Publication Data

US 2009/0003259 A1    Jan. 1, 2009

Related U.S. Application Data

(60) Provisional application No. 60/946,510, filed on Jun. 27, 2007.

(51) Int. Cl.
*H04B 7/14* (2006.01)
*H04J 1/10* (2006.01)
*H04J 3/08* (2006.01)

(52) U.S. Cl. ........................................... 370/315

(58) Field of Classification Search ................. 455/13.1; 370/315

See application file for complete search history.

(56) References Cited

U.S. PATENT DOCUMENTS

| | | | |
|---|---|---|---|
| 6,807,426 B2 * | 10/2004 | Pankaj | 455/453 |
| 2006/0105709 A1 * | 5/2006 | Oh et al. | 455/13.1 |
| 2007/0155391 A1 * | 7/2007 | Kang et al. | 455/450 |
| 2007/0264932 A1 * | 11/2007 | Suh et al. | 455/13.1 |
| 2008/0056184 A1 * | 3/2008 | Green | 370/329 |
| 2008/0108369 A1 * | 5/2008 | Visotsky et al. | 455/455 |
| 2009/0252079 A1 * | 10/2009 | Zhang et al. | 370/315 |

OTHER PUBLICATIONS

Hottinen et al., Subchannel Assignment in OFDM Relay Nodes; IEEE; 2006; pp. 1314-1317.

Viswanathan et al., Performance of Cellular Networks with Relays and Centralized Scheduling; IEEE; 2003; pp. 1923-1928.

Sundaresan et al., On Exploiting Diversity and Spatial Reuse in Relay-enabled Wireless Networks; MobiHoc '08; May 26-30, 2008; Hong Kong, S.A.R. China; 10 pages.

\* cited by examiner

*Primary Examiner* — Jeffrey Pwu
*Assistant Examiner* — Majid Esmaeilian
(74) *Attorney, Agent, or Firm* — James Bitetto; Joseph Kolodka

(57) ABSTRACT

A scheduling system and method for use with relay-assisted wireless networks includes accessing feedback from mobile stations in a network and arranging users associated with a relay station in a list in accordance with marginal utilities. A determination of whether the users in the list can be eliminated from feedback overhead by testing conditions for feedback reduction is made. A diversity schedule is generated by employing a weighted bipartite graph with relay channels and access channels and performing a matching method. A transmission schedule is generated for channel usage in accordance with multi-user and channel diversity for mobile users and spatial reuse of channels across relay and access hops by incorporating rate feedback and interference for the mobile stations and the relay stations based upon the matching method applied to a new weighted graph which accounts for traffic loads and fairness as well.

16 Claims, 6 Drawing Sheets

SYSTEM AND METHOD FOR SCHEDULING IN RELAY-ASSISTED WIRELESS NETWORKS

RELATED APPLICATION INFORMATION

This application claims priority to provisional application Ser. No. 60/946,510 filed on Jun. 27, 2007, and incorporated herein by reference.

BACKGROUND

1. Technical Field

The present invention relates to network scheduling and more particularly to optimizing throughput, overhead and performance in relay-assisted wireless networks.

2. Description of the Related Art

There has been an increasing demand to provide ubiquitous mobile access for a multitude of services ranging from conventional data to real-time streaming applications. To meet such requirements, the existing cellular systems need to be enhanced to provide improved data rates and connectivity. Adding less sophisticated and less expensive "relay" stations (RS) to a network helps improve the throughput and coverage in the network.

Introduction of relays transforms a network into a two-hop network, which is not as complex as a multi-hop network but at the same time not as straight-forward as a cellular network, thereby allowing for unique optimizations. Such two-hop networks not only provide multi-user and channel diversity (available in orthogonal frequency-division multiplexing (OFDM) systems) but also provide spatial reuse across relay and access links due to the introduction of relays. However, the exploitation of these diversities and spatial reuse at a base station (BS) require significant amount of feedback overhead on the relay links, thereby bringing down the capacity of the relay links, which already form a bottleneck.

Prior art systems leverage only the diversity aspects of these networks, and do not exploit spatial reuse. In addition, the prior art does not focus on reducing feedback overhead on the relay links, which is especially high in the presence of multiple channels given that the relay links already form a bottleneck.

SUMMARY

Relay-assisted cellular networks are provided herein for improving aspects of cellular networks. Scheduling forms an important component in the efficient exploitation of the gains delivered by relay-assisted cellular networks.

A scheduling system and method for use with relay-assisted networks includes accessing feedback from mobile stations in a network and arranging users associated with a relay station in a list in accordance with marginal utilities. A determination of whether the users in the list can be eliminated from feedback overhead by testing conditions for feedback reduction is made. A diversity schedule is generated by employing a weighted bipartite graph with relay channels and access channels and performing a bipartite matching method. A transmission schedule is generated for channel usage in accordance with multi-user and channel diversity for mobile users and spatial reuse of channels across hops by incorporating a feedback set and interference for the mobile stations and the relay stations based upon the matching method applied to a new weighted graph which accounts for traffic loads and fairness.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

A problem considered in accordance with the present principles is to improve throughput performance of relay-assisted orthogonal frequency-division multiplexing (OFDM) cellular networks through exploitation of diversity (multi-user and channel) and spatial reuse, while maintaining scalability of feedback overhead. This is achieved by (i) scheduling methods that leverage diversity and spatial reuse gains, and (ii) a feedback reduction mechanism that, when used with the scheduling methods, reduces the feedback overhead significantly, making it scalable. Feedback measures channel characteristics, which is usually performed by mobile stations. The feedback is provided to the base station or in this case to relay stations as well. The resources needed for collecting this feedback are considered in feedback overhead.

Competitive advantages over conventional systems include the following. The present embodiments provide high performance scheduling methods that leverage both diversity and spatial reuse gains effectively in relay-enabled cellular networks; and achieve high performance at a significantly reduced feedback overhead that scales only with the number of relays in the network.

Embodiments described herein may be entirely hardware, entirely software or including both hardware and software elements. In a preferred embodiment, the present invention is implemented in a combination of hardware and software. The software may include but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

Figure 1:
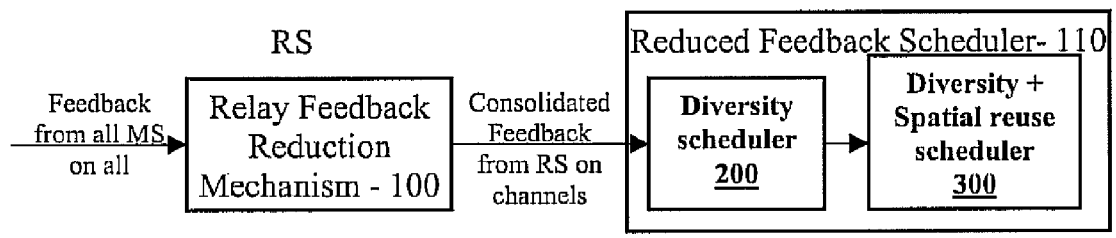
FIG. 1 is a block/flow diagram showing a scheduler system in accordance with one illustrative embodiment.

Referring now to the drawings in which like numerals represent the same or similar elements and initially to FIG. 1, a block/flow diagram illustratively depicts a system/method 50 representing a reduced feedback mechanism at a relay station (RS) 100 and a scheduler 110 at a base station (BS). Two main components of system 50 include a feedback reduction mechanism (FRM) 100 at the RS to consolidate feedback information from mobile stations (MS) and hence reduce overhead on the relay links, and an efficient scheduling mechanism (SDS) 110 at the BS to leverage the diversity with a diversity scheduler 200 and spatial reuse gains with a diversity and spatial reuse scheduler 300 across both the relay and access hops in the network, while providing reduced, scalable feedback. The scheduling mechanism 110 may be referred to as a reduced feedback scheduler and receives consolidated feedback from the RS on channels.

The reduced feedback scheduler 110 includes the diversity scheduler 200, and the combined diversity and spatial reuse scheduler 300. Both the diversity scheduler 200 and the combined diversity and spatial reuse scheduler 300 incorporate the reduced feedback mechanism.

Notations used herein: $r_{i,n}^{acc}$—rate of user i on access channel n, $r_{i,n}^{rel}$—rate of user i (its associated relay) on relay channel n, $\bar{r}_i$—average throughput received by user i, $r_{min}^{rel}$—minimum rate available in relay channels, $F_{q,n}^{acc}$—feedback from RS q on access channel n, $F_{q,n}^{rel}$—feedback from RS q on relay channel n, $w_{m,n}$—weight of edge connecting relay channel m and access channel n in the bipartite graph between relay and access channels, $S_{q,n}$—transmit power used by BS towards RS q on relay channel n, $P_{k,n}$—transmit power used by RS towards MS k on access channel n, $I_{x\rightarrow y,n}$—interference from BS/RS (x) towards MS/RS (y) on channel n.

Figure 2:
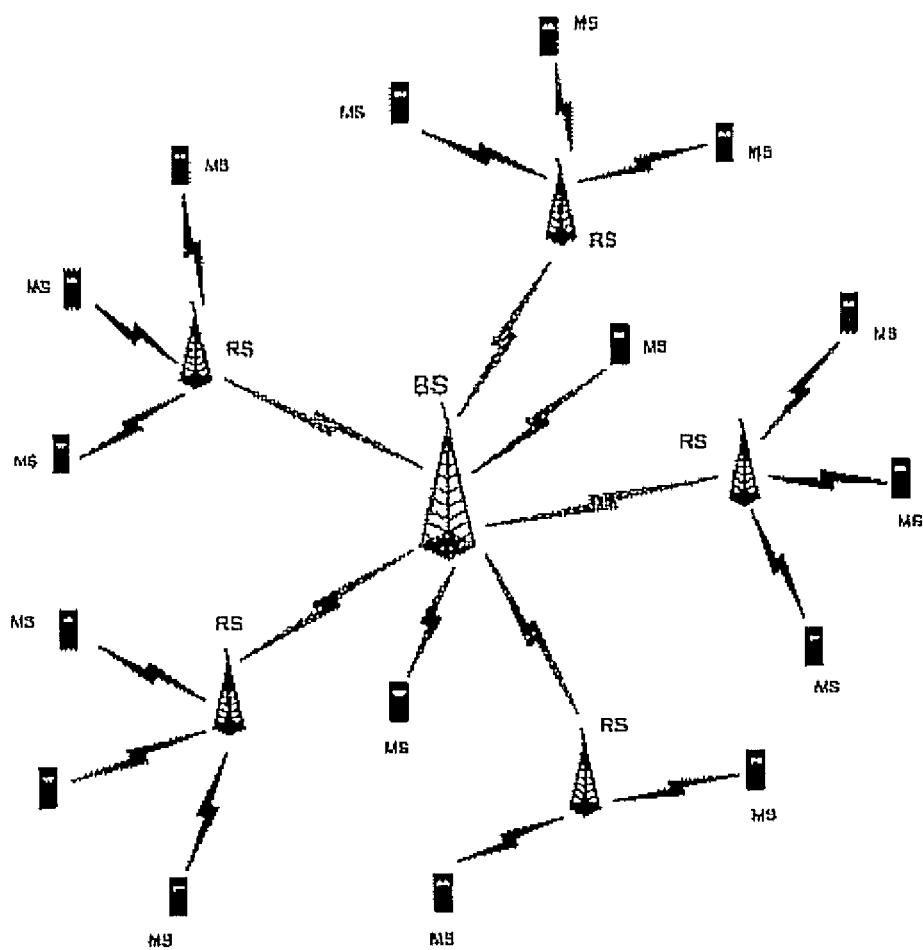
FIG. 2 is a network diagram showing a two hop relay-assisted wireless network.

Referring to FIG. 2, a downlink OFDM-based, relay-enabled cellular system 150 is illustratively shown. A set of k mobile stations (MS) are uniformly located within the cell radius $r_c$. A small set of R relay stations (RS) are added to the system. MS's within the coverage of the BS directly communicate with the BS. However, MS's outside the direct coverage of the BS connect with the RS that is closest to them. The links between BS and RS are referred to as relay links, while those between BS and MS as well as between RS and MS are referred to as access links. A two-hop network model is presented in FIG. 2. Note that this generic model applies to several applications such as RS serving as mobile access points on-board a transportation vehicle, static access points inside an office building, etc.

We consider OFDM as the air interface technology, and assume that the BS, RS and MS are allowed to operate on multiple channels from a set of N total sub-channels. The RS do not generate traffic of their own. Let P denote the maximum power used by BS for its transmission, which is split equally across all sub-channels and no power control is assumed. Note that a sub-channel could correspond to a single carrier or a group of contiguous carriers as in practical systems. Since the present illustrative scheduler is not specific to any particular receiver processing scheme, we may illustratively employ the well-known Shannon capacity as the model for instantaneous channel rate estimation which includes the instantaneous rate, channel frequency response and noise level for user k on sub-channel 1.

All stations (BS, RS and MS) are assumed to be half-duplex. As a result, an RS can be active on only its relay or access link in any given slot but not both.

Figure 3:
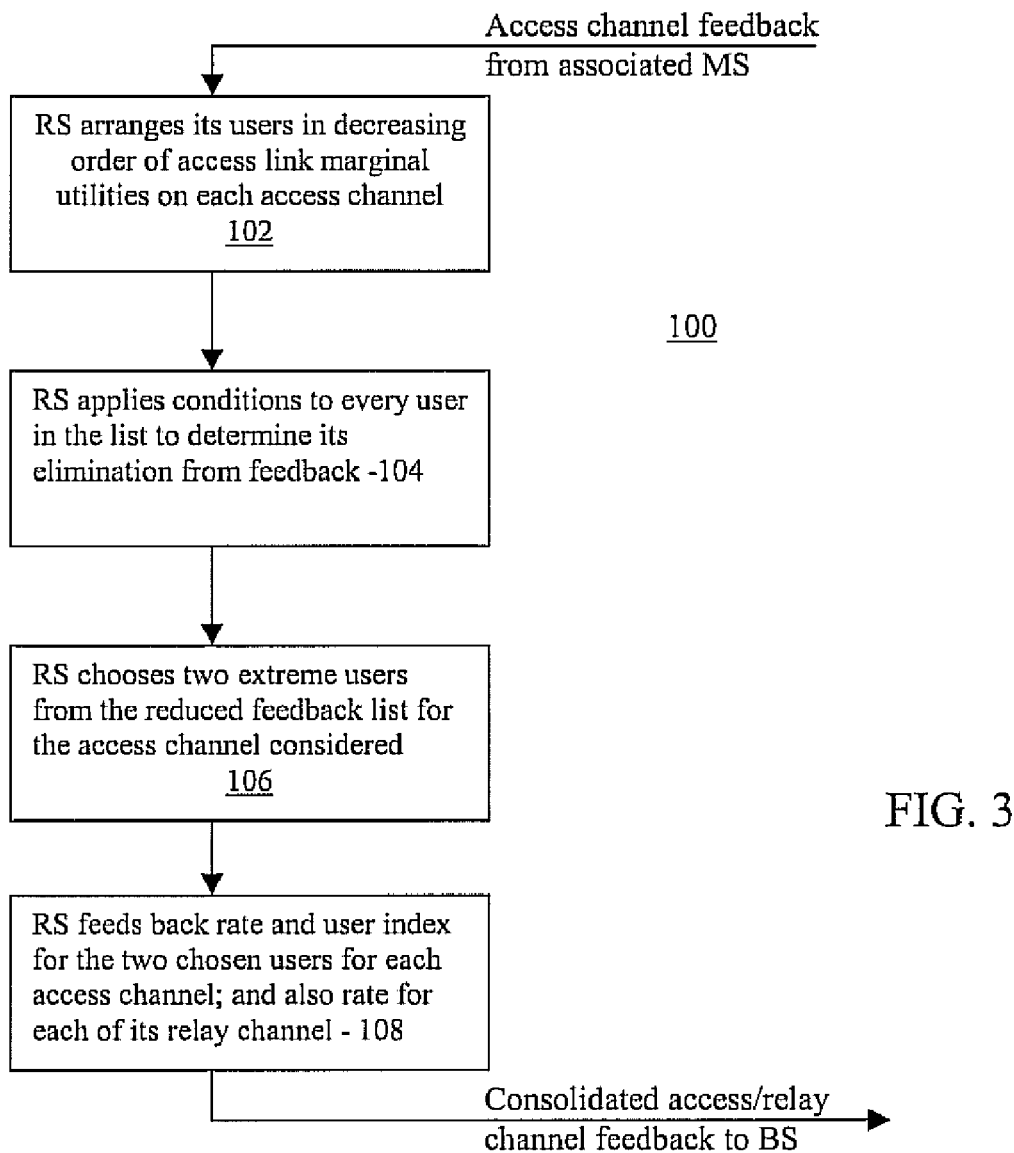
FIG. 3 is a block/flow diagram showing a feedback reduction mechanism/method in accordance with one embodiment.

Referring to FIG. 3, the relay feedback reduction mechanism at each RS (FRM) 100 includes the following modules/steps. Access channel feedback from associated mobile stations (MS) is provided to block 102 as input. Each RS (q) assigns all its users to a potential feedback set ($L_m$) for each access channel (m). In block 102, the RS arranges its users in decreasing order of access link marginal utilities on each access channel. For each (m), each RS (q) arranges users from the feedback set in decreasing order of access link marginal utility: Assume the following resulting order:

$$\frac{r_{i,n}^{acc}}{\bar{r}_i} \geq \frac{r_{j,n}^{acc}}{\bar{r}_j} \geq \frac{r_{k,n}^{acc}}{\bar{r}_k}$$

The above equation arranges the users in the decreasing order of their marginal utilities. Marginal utility includes e.g., the ratio shown above or may employ other criteria. A mapping of the sort list index to actual user index is maintained.

In block 104, the RS applies conditions to every user in the list to determine its elimination from feedback. RS (q) starts from the user in the list with the highest marginal utility. For each selected user (i), the RS removes the users (j) following (i) that satisfy at least one of the conditions, namely:

$$r_{j,n}^{acc} > r_{i,n}^{acc}, \bar{r}_j > \bar{r}_i, \frac{r_{i,m}^{acc}\left(1 - \frac{\bar{r}_j}{\bar{r}_i}\right)}{\frac{r_{i,m}^{acc}}{r_{j,m}^{acc}} \cdot \frac{\bar{r}_j}{\bar{r}_i} - 1} < r_{min}^{rel}.$$

The above set of conditions determines if user (j) can be eliminated if user (i) has already been selected. The remaining users are ordered once again and the user map updated.

RS q starts with the last (lowest) utility user and moves iteratively towards the first user. For every chosen user j, RS determines if its feedback is required with respect to its preceding i and succeeding k users in the feedback list using the following condition:

$$r_{j,n}^{acc} \leq \frac{(\bar{r}_i - \bar{r}_k)\bar{r}_j r_{i,n}^{acc} r_{k,n}^{acc}}{(r_{i,n}^{acc} - r_{k,n}^{acc})\bar{r}_i \bar{r}_k - \bar{r}_j(r_{i,n}^{acc}\bar{r}_k - r_{k,n}^{acc}\bar{r}_i)}.$$

If the inequality above is not satisfied, user (j) is removed from potential feedback, reducing the feedback set further. The further reduced feedback set and user mapping are updated.

In block 106, the RS chooses two extreme users from the final reduced feedback list for each access channel considered. Each RS (q) sends access rate information and user index for its two extreme users from the final feedback set for every access channel (m):

$$F_{q,m}^{acc} = \left\{\max_{k \in L_m}\left\{\frac{r_{k,m}^{acc}}{\bar{r}_k}\right\}, \min_{k \in L_m}\left\{\frac{r_{k,m}^{acc}}{\bar{r}_k}\right\}, \operatorname{argmax}_{k \in L_m}\left\{\frac{r_{k,m}^{acc}}{\bar{r}_k}\right\} \operatorname{argmin}_{k \in L_{nt}}\left\{\frac{r_{k,m}^{acc}}{\bar{r}_k}\right\}\right\}$$

$$F_{q,m}^{acc} = \left\{\max_{k \in L_m}\left\{\frac{r_{k,m}^{acc}}{\bar{r}_k}\right\}, \min_{k \in L_m}\left\{\frac{r_{k,m}^{acc}}{\bar{r}_k}\right\}, k_{q,m}^{max}, k_{q,m}^{min}\right\}$$

The above equation determines which two users are sent as feedback from RS (q) on access channel (m); namely, the two users with the maximum and minimum marginal utilities from the final feedback set are sent.

In block 108, the RS feeds back a rate and user index for the two chosen users for each access channel, and also the rate for each of its relay channels. Each RS (q) sends relay rate information on every relay channel (n):

$$F_{q,n}^{rel} = \langle r_{q,n}^{rel} \rangle$$

Block 108 outputs consolidated access/relay channel feedback to the BS.

Figure 4:
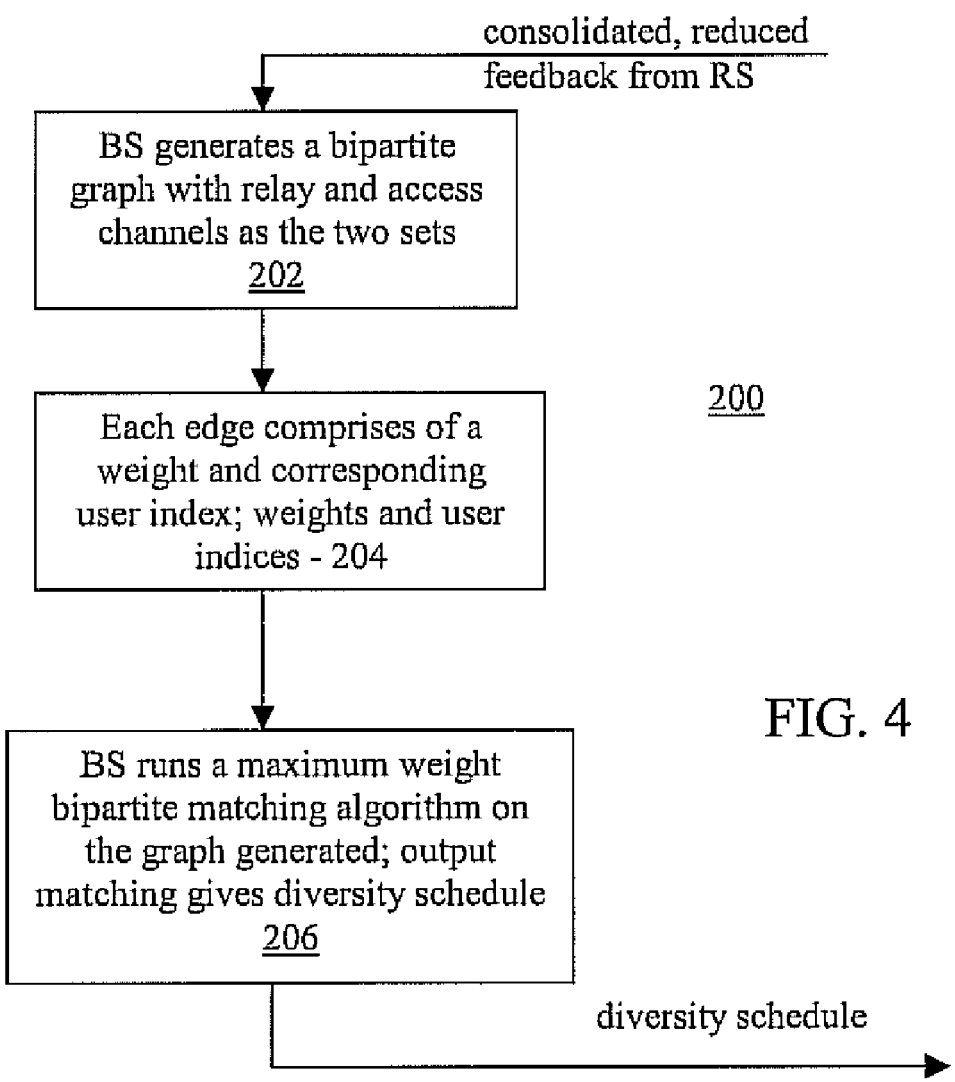
FIG. 4 is a block/flow diagram showing a diversity scheduler/method in accordance with one embodiment.
Figure 5:
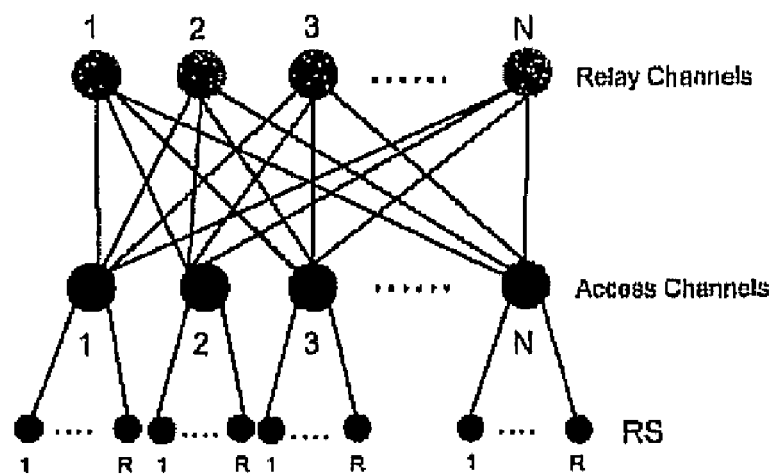
FIG. 5 is an example of a bipartite graph employed in a matching method in accordance with one embodiment.

Referring to FIG. 4, a block/flow diagram illustratively shows the diversity scheduler 200 at the BS. Upon receiving the consolidated reduced feedback from the RS, the BS generates a bipartite graph with relay and access channels as the two sets in the graph in block 202. The graph $G=(V_1 \cup V_2, E)$ where $V_1$ and $V_2$ correspond to the set of sub-channels on the relay and access links with $|V_1|=|V_2|=N$ as shown in FIG. 5. The edge set E corresponds to $N^2$ edges connecting all possible pairs of vertices in the two sets.

The BS uses the rate feedback on the relay channels and the consolidated rate feedback on the access channels sent by RS using FRM 100 to construct the bipartite graph including the relay and access channels. A maximum weight bipartite matching method is run on this graph and the resulting matching is utilized by a scheduling method described below.

In block 204, each graph edge includes a weight and corresponding user index. Weights and user indices are obtained as follows.

The weights needed for the bipartite graph may be determined from the feedback obtained as follows:

$$w_{m,n} = \max_q \left\{ \left( \frac{1}{\bar{r}_{k_q^{max},n}} \right) \left( \frac{r_{q,n}^{rel} \cdot r_{k_q^{max},n}^{acc}}{r_{q,n}^{rel} + r_{k_q^{max},n}^{acc}} \right), \left( \frac{1}{\bar{r}_q^{min},n} \right) \left( \frac{r_{q,n}^{rel} \cdot r_{k_q^{min},n}^{acc}}{r_{q,n}^{rel} + r_{k_q^{min},n}^{acc}} \right) \right\}, \forall n$$

The above equation indicates how the weight on an edge (m,n) should be computed in the bipartite graph. Other weighting systems may also be employed.

In block 206, the BS runs a maximum weight bipartite matching method on the generated graph. The users associated with the resulting matching provide an assignment of relay and access channels to users. Output matching provides a diversity schedule. A diversity schedule is for distributing transmissions across multiple channels on the two hops. A diversity schedule is output to the diversity and spatial and reuse scheduler 300.

Figure 6:
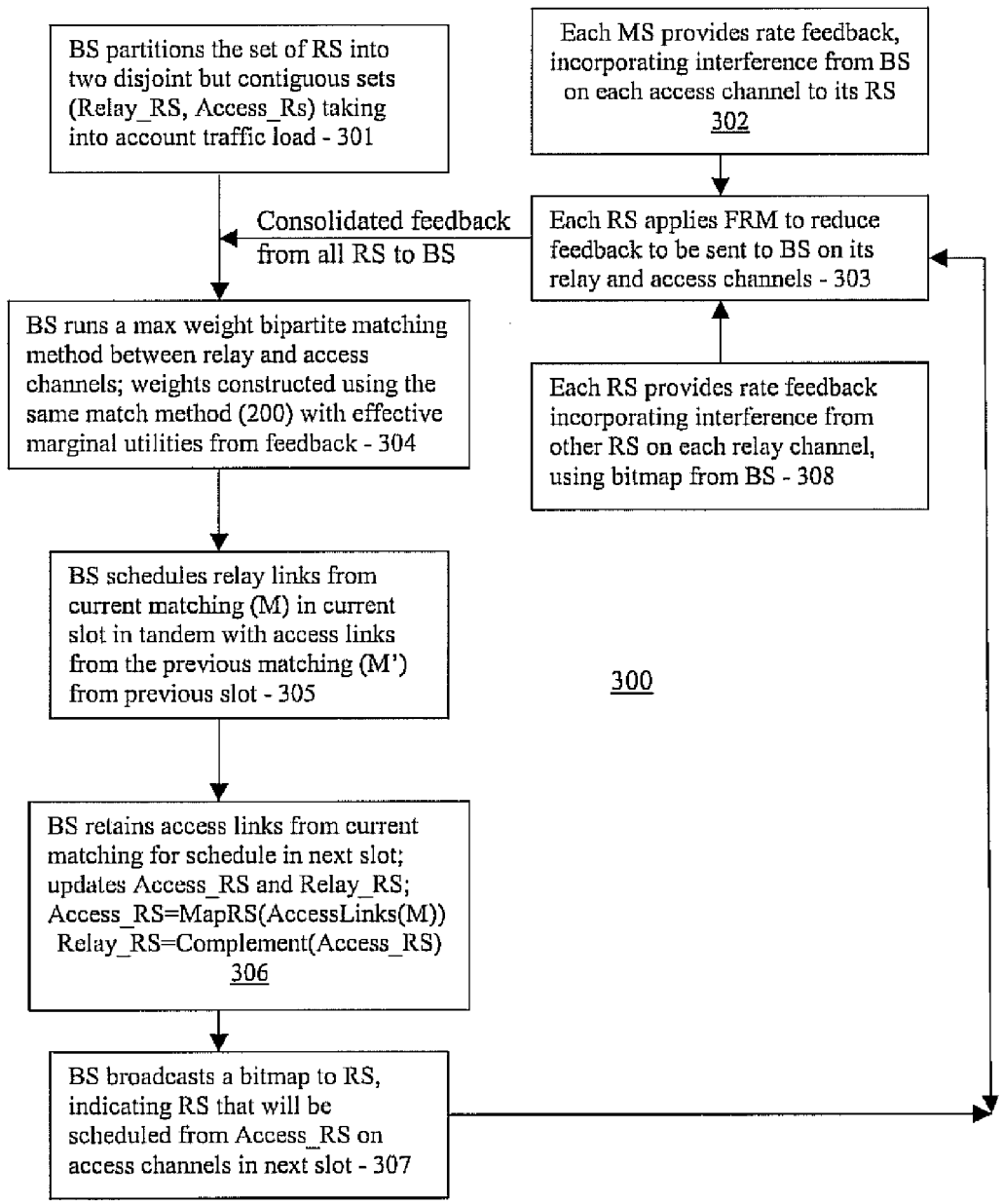
FIG. 6 is a block/flow diagram showing a diversity and reuse scheduler/method in accordance with one embodiment.

Referring to FIG. 6, a block/flow diagram illustratively depicts modules/steps for the scheduler 300 at BS which exploits diversity and spatial reuse (SDS). Spatial reuse includes the relay network reusing channels on the relay and access links, whereby multiple RS's can operate on the same channel at the same time slot if they do not interfere with each other. In block 301, the BS partitions the set of RS into two disjoint but contiguous sets (e.g., Relay_RS, and Access_RS) taking into account traffic load. The BS maintains two complementary sets: Relay_RS and Access_RS, indicating the set of RS's that are allowed to operate on the relay and access links in a given slot. Initially, Relay_RS may include half of all the available contiguous RS's.

In block 302, each MS provides rate feedback, incorporating interference from the BS on each access channel to its RS. Each MS(k) associated with RS(q) in Relay_RS updates its access rates on each access channel (n) based on anticipated interference from BS:

$$r_{k,n}^{acc} = \log\left(1 + \frac{P_{k,n}}{N_{k,n} + I_{BS \to k,n}}\right)$$

The above equation indicates how the rate is computed on an access channel (n) by MS (k) taking into account the interference generated by BS on a relay hop on the same channel (n), where P is the maximum power, $r_{k,n}^{acc}$ is the instantaneous access channel rate on subchannel n for user k, $N_{k,n}$ is the noise level and $I_{BS \to k,n}$ is the interference from BS to the user.

In block 304, BS runs MATCH (matching on the bipartite graph as described above) on only the relays in Relay_RS and its associated users. Relay links from the matching (M) are alone scheduled in the first slot. For example, the BS runs a maximum weight bipartite matching method between relay and access channels. Weights are constructed using (MATCH in scheduler 200) effective marginal utilities from feedback as shown before.

In block 305, the BS schedules relay links from current matching (M) in the current slot in tandem with access links from the previous matching (M') waiting from the previous slot. BS runs MATCH on the relays in Relay_RS; relay links from the resulting matching M are scheduled in tandem with the access links obtained from matching M' in the previous slot; access links from M are retained for scheduling in the next slot.

In block 306, the BS retains access links from the current matching (M) for scheduling in the next slot and updates Access_RS and Relay_RS.

Access links from this matching are retained to be scheduled in the next slot with the associated relays forming the Access_RS set: Access_RS=MapRS(AccessLinks(M))

The BS updates Relay_RS to be the complement of Access_RS: Relay_RS=Complement(Access_RS).

The BS broadcasts a bitmap to RS, indicating the RS that will be scheduled from Access_RS on access channels in the next slot in block 307. During the schedule of the relay links of the current slot, BS broadcasts a bitmap (BM) to all RS's indicating the RS to be scheduled on specific access channels in the next slot.

In block 308, each RS provides rate feedback incorporating interference from other RS's on each relay channel using the bitmap from the BS.

Each RS (q) in the new Relay_RS updates its relay channel rates on each relay channel (n) based on anticipated interference from other RS's that will operate in tandem on the same channel in the access hop using the bitmap information:

$$r_{q,n}^{rel} = \log\left(1 + \frac{S_{q,n}}{N_{q,n} + \sum_{j \in Access\_RS} I_{j \to q,n} B_{j,n}}\right) \text{ where } BM(n) = RS_j \Rightarrow B_{j,n} = 1$$

The above equation indicates how the rate on a relay channel (n) is computed by RS (q), while taking into account the interference generated by all other RS (j) operating on the same channel (n) but on the access hop.

In block 303, each RS applies FRM 100 to reduce feedback to be sent to the BS on its relay and access channels. Each RS (q) sends rate feedback using the reduced feedback approach (FRM). This needs no incorporation of interference in the first slot but will incorporate interference in subsequent slots.

Each RS q in Relay_RS sends feedback as outlined in FRM but with the incorporation of anticipated interference on both its relay and access links.

Consolidated feedback from all RS's to the BS is provided to block 304 from block 303. BS repeats the process of interference constrained maximum utility matching (steps 304,305), generating the spatial reuse schedule for current slot (step 306), and indicating the access hop interference in next slot through bitmap (step 307) in subsequent slots.

RS correspondingly incorporate the access hop interference information for next slot from bitmap to generate appropriate feedback on relay and access hops to BS (steps 302, 303,308) and the entire process repeats in subsequent slots.

Having described preferred embodiments of a system and method for scheduling in relay-assisted cellular networks (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A scheduling method for use with relay-assisted networks, comprising:
accessing feedback from mobile stations in a network;
arranging users associated with a relay station in a list in accordance with marginal utilities;
determining whether the users in the list can be eliminated from feedback overhead by testing conditions for feedback reduction;
generating a diversity schedule by employing a weighted graph with relay channels and access channels and performing a matching method; and
generating a transmission schedule for channel usage in accordance with channel diversity for mobile users and spatial reuse of relay station channels by incorporating rate feedback and interference for the mobile stations and the relay stations based upon the matching method applied to a new weighted graph which accounts for traffic loads;
wherein testing conditions for feedback reduction includes applying at least one of the following conditions:

$$r_{j,n}^{acc} > r_{i,n}^{acc}, \bar{r}_j > \bar{r}_i, \frac{r_{i,m}^{acc}\left(1 - \frac{\bar{r}_j}{\bar{r}_i}\right)}{\frac{r_{i,m}^{acc}}{r_{j,m}^{acc}} \cdot \frac{\bar{r}_j}{\bar{r}_i} - 1} < r_{min}^{rel}$$

where $r_{i,n}^{acc}$—rate of user i on access channel n, $r_{j,n}^{acc}$ is a rate of user j on access channel n, $r_{i,m}^{acc}$ is a rate of user i on access channel m, $r_{j,m}^{acc}$ is a rate of user j on access channel m, $\bar{r}_i$ is an average throughput received by user i, $\bar{r}_j$ in an average throughput received by user j and $r_{min}^{rel}$ is a minimum rate available in relay channels; all rates and throughputs are positive with rates being limited by a system defined maximum Rmax, zero in the denominator being avoided by condition $$\frac{r_{i,m}^{acc}\left(1 - \frac{\bar{r}_j}{\bar{r}_i}\right)}{\frac{r_{i,m}^{acc}}{r_{j,m}^{acc}} \cdot \frac{\bar{r}_j}{\bar{r}_i} - 1} < r_{min}^{rel}$$

being equivalently checked as $$r_{i,m}^{acc}\left(1 - \frac{\bar{r}_j}{\bar{r}_i}\right) < r_{min}^{rel}\left(\frac{r_{i,m}^{acc}}{r_{j,m}^{acc}} \cdot \frac{\bar{r}_j}{\bar{r}_i} - 1\right).$$

2. The method as recited in claim 1, wherein arranging users associated with a relay station in a list in accordance with marginal utilities includes arranging users in decreasing order in the list in accordance with access link marginal utilities on each access channel.

3. The method as recited in claim 1, wherein testing conditions for feedback reduction includes applying the following condition:

$$r_{j,n}^{acc} \leq \frac{(\bar{r}_i - \bar{r}_k)\bar{r}_j r_{i,n}^{acc} r_{k,n}^{acc}}{(r_{i,n}^{acc} - r_{k,n}^{acc})\bar{r}_i \bar{r}_k - \bar{r}_j(r_{i,n}^{acc}\bar{r}_k - r_{k,n}^{acc}\bar{r}_i)}$$

such that for every chosen user j, a relay station determines if its feedback is needed with respect to its preceding i and succeeding j users in the list; all rates and throughputs are positive with rates being limited by a system defined maximum Rmax, zero in the denominator being avoided by the condition being equivalently checked as $$r_{j,n}^{acc}\{(r_{i,n}^{acc} - r_{k,n}^{acc})\bar{r}_i\bar{r}_k - \bar{r}_j(r_{i,n}^{acc}\bar{r}_k - r_{k,n}^{acc}\bar{r}_i)\} \leq (\bar{r}_i - \bar{r}_k)\bar{r}_j r_{i,n}^{acc} r_{k,n}^{acc}.$$

4. The method as recited in claim 1, wherein determining whether the users in the list can be eliminated from feedback overhead includes:
choosing exactly two users, one with maximum and one with minimum feedback rates for each access channel;
determining a feedback rate for each relay channel; and
supplying the feedback rates for the access channels and the relay channels to a base station.

5. The method as recited in claim 1, wherein generating a diversity schedule by employing a weighted graph with relay channels and access channels and performing a matching method includes:
generating a bipartite graph having vertices including access channels and relay channels;
determining weights for each edge of the graph; and
executing a maximum weight bipartite matching method to provide the diversity schedule.

6. The method as recited in claim 1, wherein generating a transmission schedule includes:
partitioning relay stations into two sets taking into account traffic load;
executing a maximum weight bipartite matching method between relay channels and access channels using a weighted graph where the weights are constructed from effective marginal utilities from feedback.

7. The method as recited in claim 6, further comprising:
scheduling relay channels from a current match in a current time slot of the transmission schedule with relay channels from a previous match in a previous time slot;

retaining access links from a current match for scheduling in a next time slot; and broadcasting a bitmap to indicate a next relay station to be scheduled in a next slot for access channels.

8. The method as recited in claim 7, further comprising:

providing rate feedback incorporating interference from other relay stations on each relay channel using the bitmap;

providing rate feedback for mobile stations incorporating interference on each access channel to a corresponding relay station; and applying feedback reduction on all relay stations.

9. A system for scheduling in relay-assisted wireless networks, comprising:

a base station;

at least one relay station in wireless communication with the base station wherein mobile station traffic is services by one of the base station and the at least one relay station;

the relay station including a feedback reduction module configured to reduce feedback from mobile stations by selectively eliminating feedback in accordance with testing conditions to provide consolidated feedback;

the base station including a reduced feedback scheduler comprising:

a diversity scheduler configured to receive the consolidated feedback and determine access channel feedback for a selected number of mobile stations and relay channel feedback from the at least one relay station to provide a channel diversity schedule; and a diversity and spatial reuse scheduler configured to receive the diversity schedule and determine relay channels without interference which can be reused and comply with the diversity channel schedule to provide a transmission schedule;

wherein testing conditions include at least one of the following conditions:

$$r_{j,n}^{acc} > r_{i,n}^{acc}, \bar{r}_j > \bar{r}_i, \frac{r_{i,m}^{acc}\left(1-\frac{\bar{r}_j}{\bar{r}_i}\right)}{\frac{r_{i,m}^{acc}}{r_{j,m}^{acc}} \cdot \frac{\bar{r}_j}{\bar{r}_i} - 1} < r_{min}^{rel}$$

where $r_{i,n}^{acc}$—rate of user i on access channel n, $r_{j,n}^{acc}$ is a rate of user j on access channel n, $r_{i,m}^{acc}$ is a rate of user i on access channel m, $r_{j,m}^{acc}$ is a rate of user j on access channel m, $\bar{r}_i$ is an average throughput received by user i, $\bar{r}_j$ in an average throughput received by user j and $r_{min}^{rel}$ is a minimum rate available in relay channels; all rates and throughputs are positive with rates being limited by a system defined maximum Rmax, zero in the denominator being avoided by condition $$\frac{r_{i,m}^{acc}\left(1-\frac{\bar{r}_j}{\bar{r}_i}\right)}{\frac{r_{i,m}^{acc}}{r_{j,m}^{acc}} \cdot \frac{\bar{r}_j}{\bar{r}_i} - 1} < r_{min}^{rel}$$

being equivalently checked as $$r_{i,n}^{acc}\left(1-\frac{\bar{r}_j}{\bar{r}_i}\right) < r_{min}^{rel}\left(\frac{r_{i,m}^{acc}}{r_{j,m}^{acc}} \cdot \frac{\bar{r}_j}{\bar{r}_i} - 1\right).$$

10. The system as recited in claim 9, wherein the feedback reduction module arranges users associated with a relay station in a list in decreasing order in accordance with marginal utilities.

11. The system as recited in claim 9, wherein the testing conditions include:

$$r_{j,n}^{acc} \leq \frac{(\bar{r}_i - \bar{r}_k)\bar{r}_j r_{i,n}^{acc} r_{k,n}^{acc}}{(r_{i,n}^{acc} - r_{k,n}^{acc})\bar{r}_i \bar{r}_k - \bar{r}_j(r_{i,n}^{acc}\bar{r}_k - r_{k,n}^{acc}\bar{r}_i)}$$

such that for every chosen user j, a relay station determines if its feedback is needed with respect to its preceding i and succeeding j users in the list; all rates and throughputs are positive with rates being limited by a system defined maximum Rmax, zero in the denominator being avoided by the condition being equivalently checked as $$r_{j,n}^{acc}\{(r_{i,n}^{acc} - r_{k,n}^{acc})\bar{r}_i\bar{r}_k - \bar{r}_j(r_{i,n}^{acc}\bar{r}_k - r_{k,n}^{acc}\bar{r}_i)\} \leq (\bar{r}_i - \bar{r}_k)\bar{r}_j r_{i,n}^{acc} r_{k,n}^{acc}.$$

12. The system as recited in claim 9, wherein the feedback reduction module determines whether the users in the list can be eliminated from feedback overhead by selecting exactly two users, one with maximum and one with minimum feedback rates for each access channel, determining a feedback rate for each relay channel; and supplying the feedback rates for the access channels and the relay channels to a base station.

13. The system as recited in claim 9, wherein the diversity scheduler includes a bipartite graph having vertices including access channels and relay channels; and a matching method which executes a maximum weight bipartite matching method to provide the diversity schedule by matching access channels and relay channels.

14. The system as recited in claim 9, wherein the diversity and spatial reuse scheduler partitions relay stations into two sets taking into account traffic load, and executes a maximum weight bipartite matching method between relay channels and access channels using a weighted graph where the weights are constructed from effective marginal utilities from feedback.

15. The system as recited in claim 14, wherein the matching method schedules relay channels from a current match in a current time slot of the transmission schedule with relay channels from a previous match in a previous time slot, retains access links from a current match for scheduling in a next time slot; and broadcasts a bitmap to indicate a next relay station to be scheduled in a next slot for access channels.

16. The system as recited in claim 15, wherein the diversity and spatial reuse scheduler collects rate feedback incorporating interference from relay stations on each relay channel using the bitmap, collects rate feedback for mobile stations incorporating interference on each access channel to each corresponding relay station, and applies feedback reduction on all relay stations.

* * * * *